United States Patent [19]
Chou

[11] Patent Number: 5,873,145
[45] Date of Patent: Feb. 23, 1999

[54] WHEEL ASSEMBLY

[76] Inventor: Cheng-Tasn Chou, 58, Ma Yuan West St., Taichung, Taiwan

[21] Appl. No.: 969,784

[22] Filed: Nov. 13, 1997

[51] Int. Cl.[6] .................................................... B60B 37/00
[52] U.S. Cl. .............................. 16/46; 301/111; 301/125; 16/44; 190/18 A
[58] Field of Search .................................. 301/111, 125, 301/126, 131, 132, 133, 119; 16/18 R, 45, 46, 20, 21, 44; 190/18 A; 280/86.1, 43.24

[56] References Cited

U.S. PATENT DOCUMENTS

| | | | |
|---|---|---|---|
| 1,875,965 | 9/1932 | Waters | 16/18 R |
| 2,596,578 | 5/1952 | Mcintyre et al. | 16/18 R |
| 2,738,542 | 4/1956 | Clark, Jr. | 16/44 |
| 2,996,752 | 8/1961 | Pope | 16/18 R |
| 3,263,266 | 8/1966 | Rabelos et al. | 16/21 |
| 5,575,361 | 11/1996 | Chou | 190/18 A |
| 5,762,168 | 6/1998 | Miyoshi | 190/18 A |

*Primary Examiner*—D. Glenn Dayoan
*Assistant Examiner*—Long Bao Nguyen

[57] ABSTRACT

A wheel assembly has a wheel holder seat having a hollow pivot end and two lugs, and a main seat having a reinforced main body, a hollow pivot cover, a notch, two inner flanges, an inner interior, and a post. The wheel holder seat has two laterals engaging with the inner flanges. A push rod has an upper recess hole. The push rod is inserted in the inner interior. A coiled spring has a lower portion inserted in the upper recess hole and an upper portion enclosing the post. The hollow pivot end is inserted in the hollow pivot cover. A pivot shaft fastens the hollow pivot cover and the hollow pivot end together. A pivot pin fastens a wheel between two lugs.

2 Claims, 8 Drawing Sheets

WHEEL ASSEMBLY

BACKGROUND OF THE INVENTION

The present invention relates to a wheel assembly. More particularly, the present invention relates to a wheel assembly which can facilitate an adjustment of an angle of a suitcase.

A suitcase often has two front wheels and two rear wheels. However, the height of the rear wheels cannot be adjusted. When the user slants the suitcase, the front wheels will be lifted. If the ground is not smooth, the rear wheels which cannot adjust their heights will not be in balance. Therefore, the suitcase may be overturned.

SUMMARY OF THE INVENTION

An object of the present invention is to provide a wheel assembly which can facilitate an adjustment of an angle of a suitcase.

In accordance with a first embodiment of the present invention, a wheel assembly comprises a main seat, a wheel holder seat disposed on a bottom of the main seat, a hollow pivot end formed on an end of the wheel holder seat, two lugs extending downward from the wheel holder seat, and the main seat having a reinforced main body, a hollow pivot cover connected to the reinforced main body, a notch formed on a lower portion of the reinforced main body, two opposite inner flanges disposed on a bottom of the reinforced main body, an inner interior formed in the reinforced main body abutting the notch, and a post extending downward from an inner upper portion of the reinforced main body. The wheel holder seat has two opposite laterals engaging with the opposite inner flanges. A push rod has an upper recess hole. The push rod is inserted in the inner interior. A coiled spring has a lower portion inserted in the upper recess hole and an upper portion enclosing the post. The hollow pivot end is inserted in the hollow pivot cover. A pivot shaft fastens the hollow pivot cover and the hollow pivot end together. A pivot pin fastens a wheel between two lugs.

In accordance with a second embodiment of the present invention, a wheel assembly comprises a main seat, a bottom seat disposed on a bottom of the main seat, the bottom seat having two bottom flanges and an upper end connected to the main seat, a wheel holder seat disposed on the bottom seat, a hollow pivot end formed on an end of the wheel holder seat, two lugs extending downward from the wheel holder seat, and the main seat having a reinforced main body, a bottom plate disposed on a bottom of the main seat, an inner interior formed in the reinforced main body, and a post extending downward from an inner upper portion of the reinforced main body. A push rod has an upper recess hole. The push rod is inserted in the inner interior. A coiled spring has a lower portion inserted in the upper recess hole and an upper portion enclosing the post. A pivot shaft fastens an upper end of the bottom seat and the hollow pivot end together. A pivot pin fastens a wheel between two lugs.

DETAILED DESCRIPTION OF THE INVENTION

Figure 1:
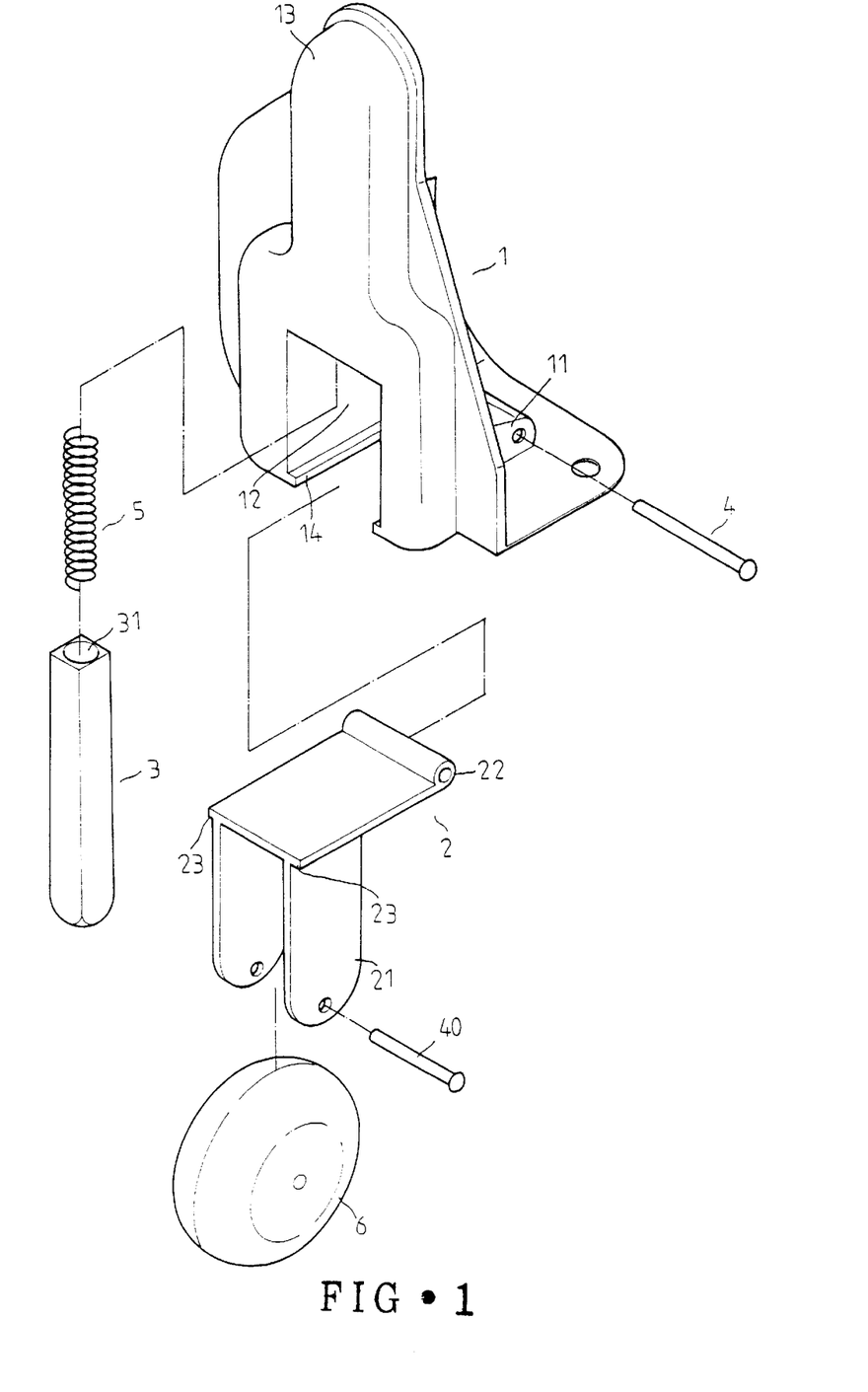
FIG. 1 is a perspective exploded view of a wheel assembly of a preferred embodiment in accordance with the present invention.
Figure 2:
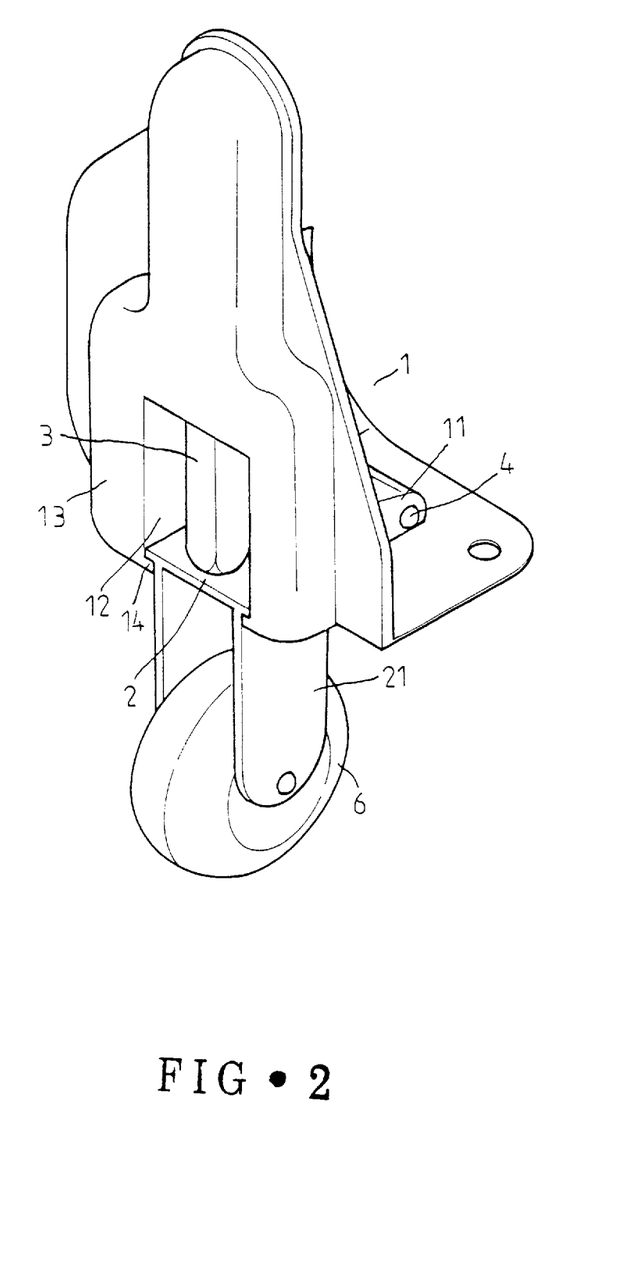
FIG. 2 is a perspective assembly view of a wheel assembly of a preferred embodiment in accordance with the present invention.
Figure 3:
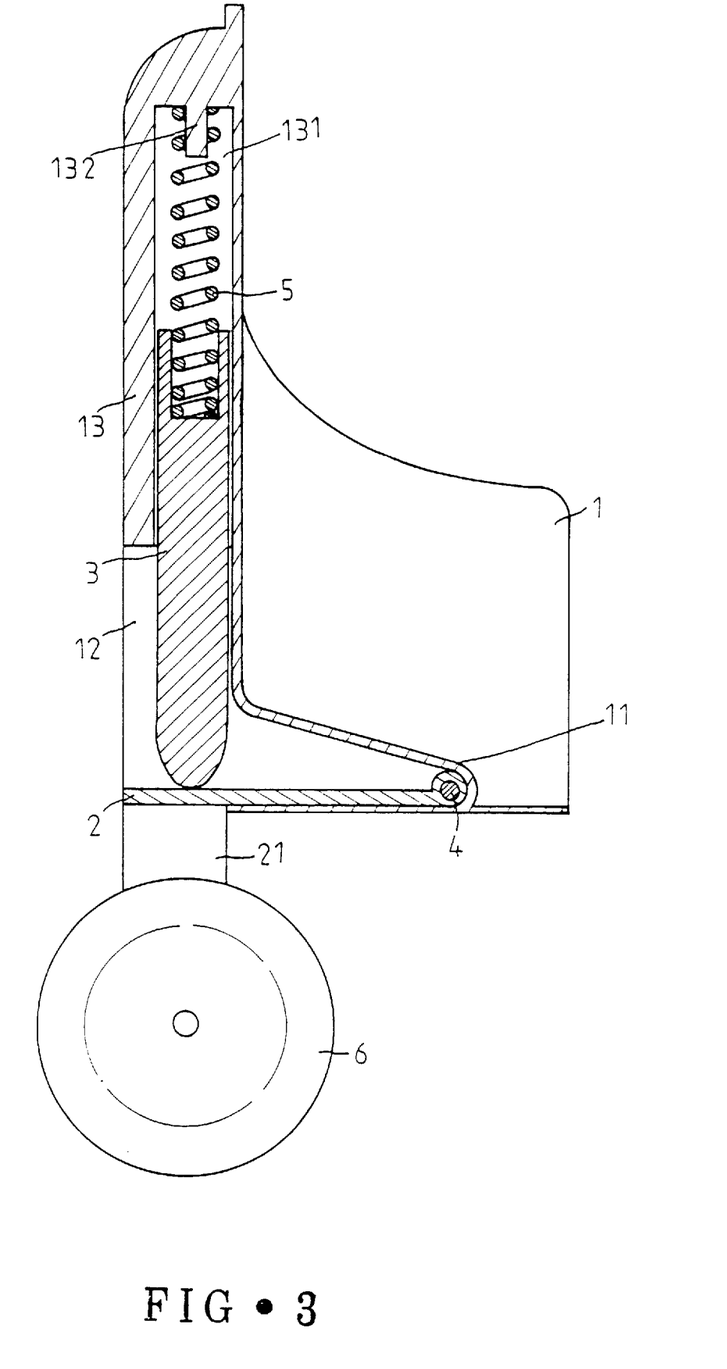
FIG. 3 is a sectional view of FIG. 2 while the wheel assembly is not operated.

Referring to FIGS. 1 to 3, a wheel assembly comprises a main seat 1, a wheel holder seat 2 disposed on a bottom of the main seat 1, a hollow pivot end 22 formed on an end of the wheel holder seat 2, two lugs 21 extending downward from the wheel holder seat 2, and the main seat 1 having a reinforced main body 13, a hollow pivot cover 11 connected to the reinforced main body 13, a notch 12 formed on a lower portion of the reinforced main body 13, two opposite inner flanges 14 disposed on a bottom of the reinforced main body 13, an inner interior 131 formed in the reinforced main body 13 abutting the notch 12, and a post 132 extending downward from an inner upper portion of the reinforced main body 13. The wheel holder seat 2 has two opposite laterals 23 engaging with the opposite inner flanges 14. A push rod 3 has an upper recess hole 31. The push rod 3 is inserted in the inner interior 131. A coiled spring 5 has a lower portion inserted in the upper recess hole 31 and an upper portion enclosing the post 132. The hollow pivot end 22 is inserted in the hollow pivot cover 11. A pivot shaft 4 fastens the hollow pivot cover 11 and the hollow pivot end 22 together. A pivot pin 40 fastens a wheel 6 between two lugs 21.

Figure 4:
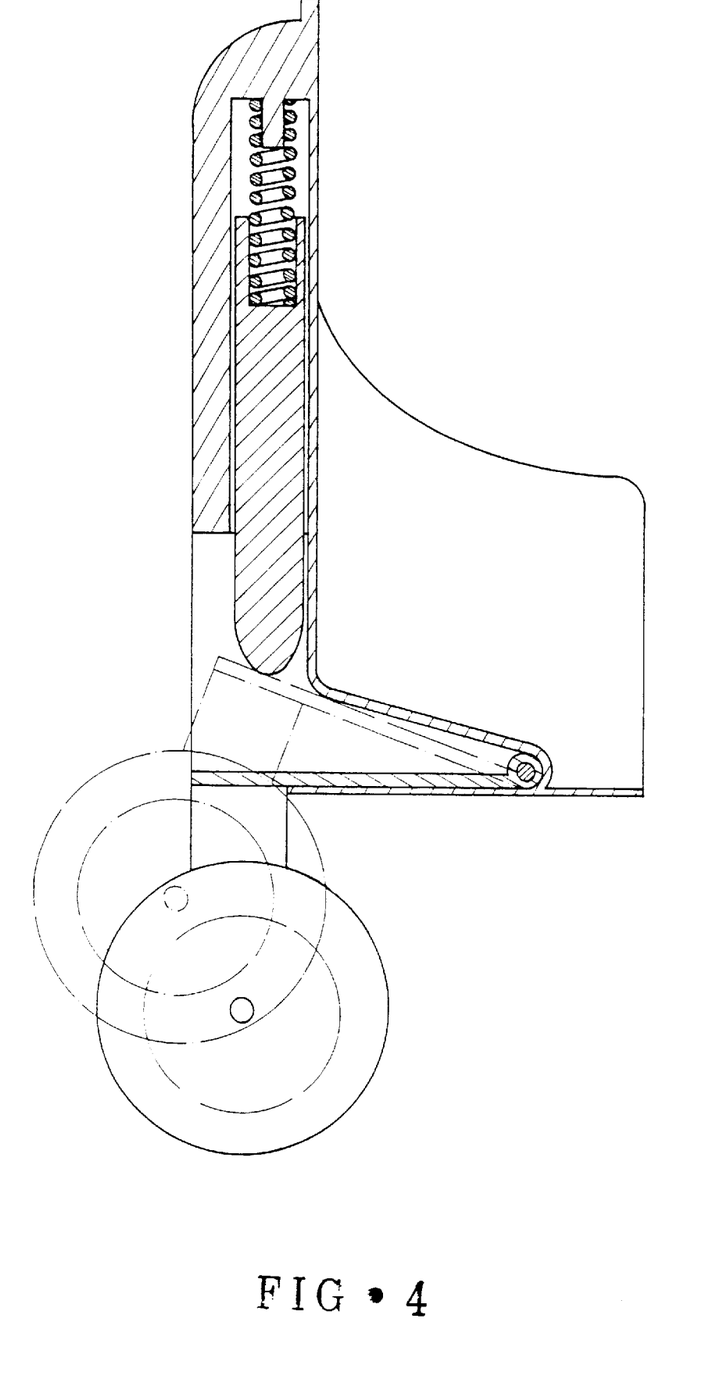
FIG. 4 is a sectional view of FIG. 2 while the wheel assembly is operated.

Referring to FIG. 4, the coiled spring 5 is compressed so that the push rod 3 moves upward. The wheel holder seat 2 moves upward also.

Figure 5:
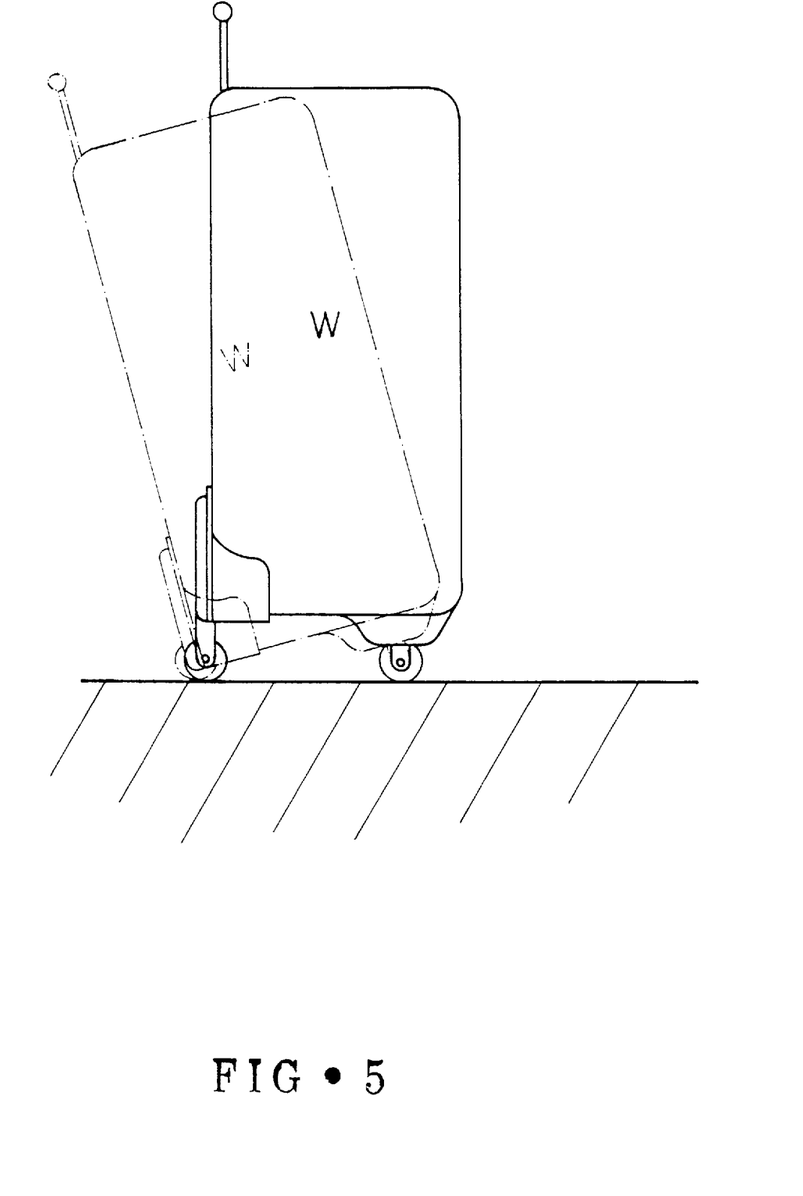
FIG. 5 is a schematic view illustrating a suitcase disposed on a wheel assembly of a preferred embodiment in accordance with the present invention.
Figure 6:
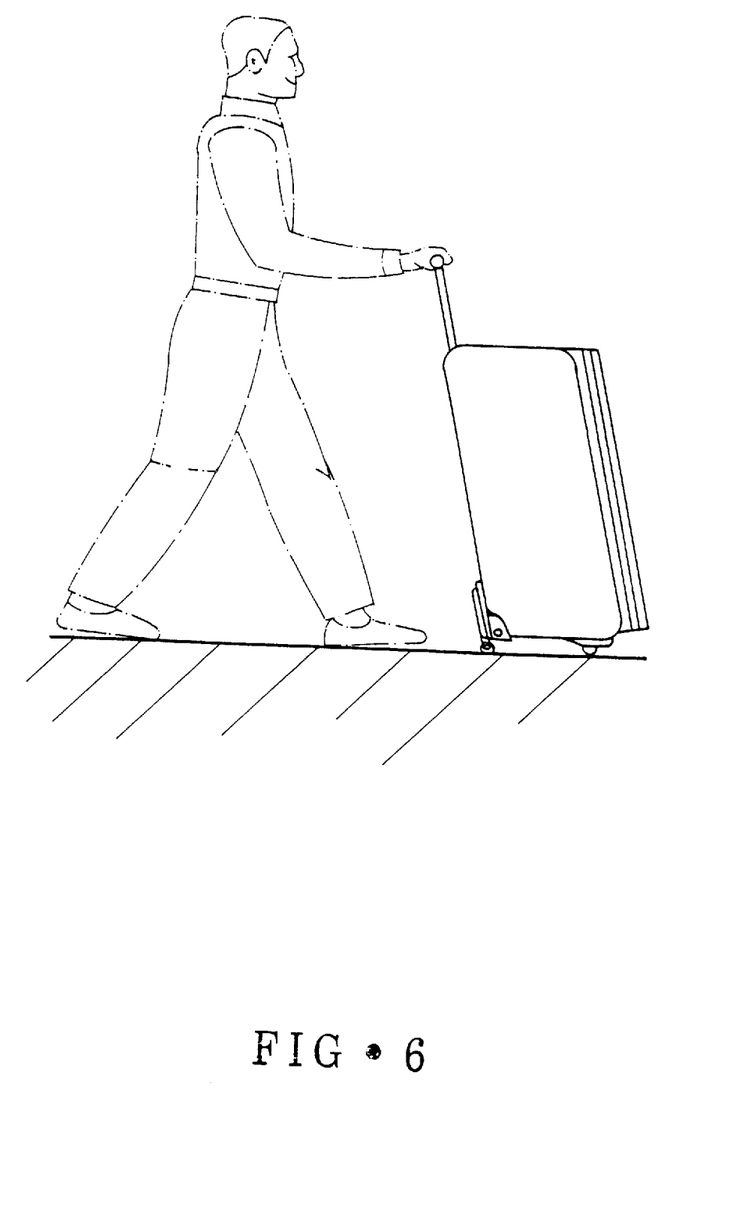
FIG. 6 is a schematic view illustrating a user operating a suitcase.

Referring to FIGS. 5 and 6, the wheel assembly can be disposed on a rear bottom of a suitcase. The angle of the wheel assembly can be adjusted.

Figure 7:
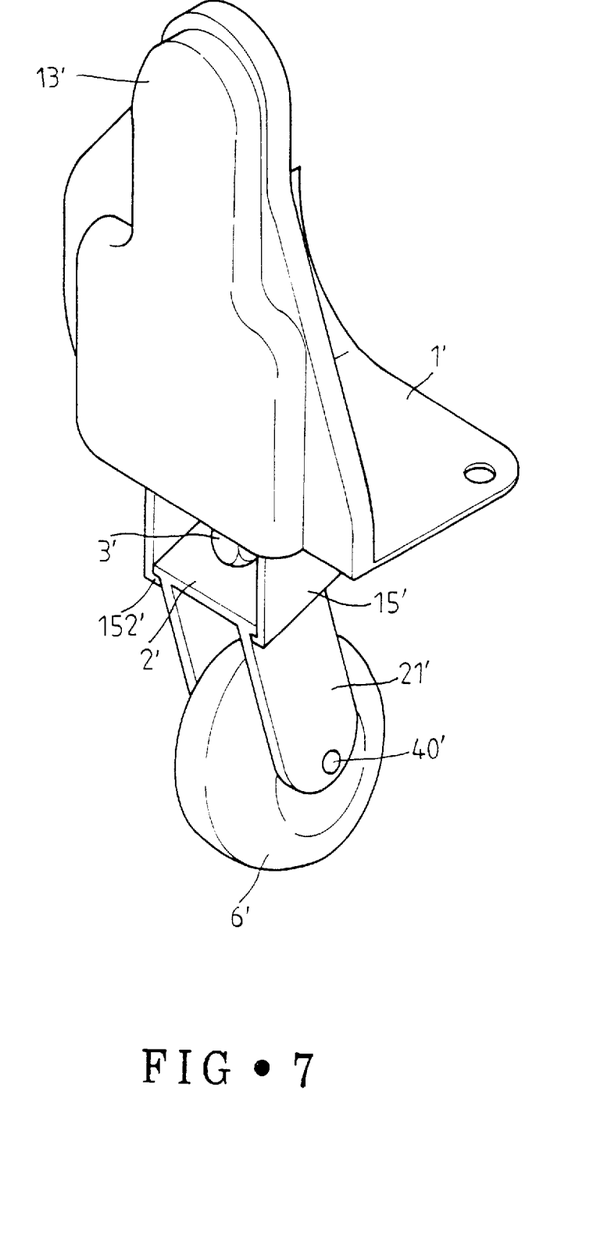
FIG. 7 is a perspective assembly view of a wheel assembly of another preferred embodiment in accordance with the present invention.
Figure 8:
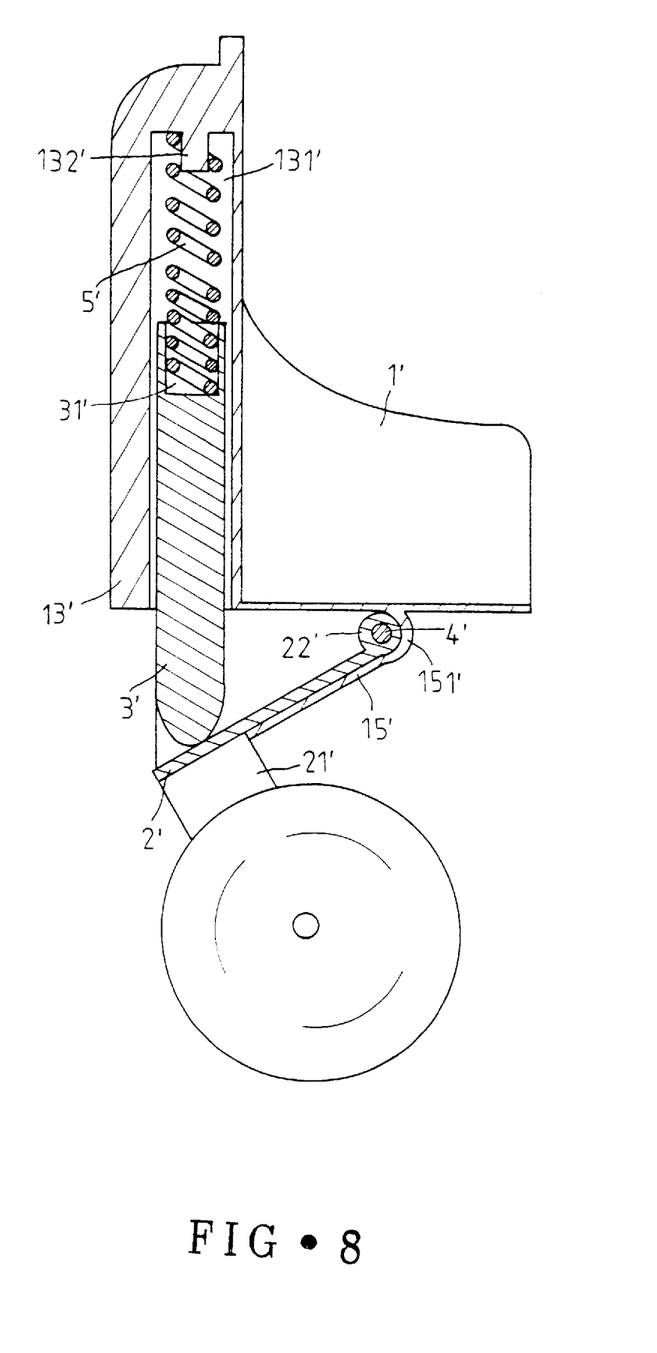
FIG. 8 is a sectional view of a wheel assembly of another preferred embodiment in accordance with the present invention.

Referring to FIGS. 7 and 8, another wheel assembly comprises a main seat 1', a bottom seat 15' disposed on a bottom of the main seat 1', the bottom seat 15' having two bottom flanges 152' and an upper end 151' connected to the main seat 1', a wheel holder seat 2' disposed on the bottom seat 15', a hollow pivot end 22' formed on an end of the wheel holder seat 2', two lugs 21' extending downward from the wheel holder seat 2', and the main seat 1' having a reinforced main body 13', a bottom plate 11' disposed on a bottom of the main seat 1', an inner interior 131' formed in the reinforced main body 13', and a post 132' extending downward from an inner upper portion of the reinforced main body 13'. A push rod 3' has an upper recess hole 31'. The push rod 3' is inserted in the inner interior 131'. A coiled spring 5' has a lower portion inserted in the upper recess hole 31' and an upper portion enclosing the post 132'. A pivot shaft 4' fastens an upper end 151' of the bottom seat 15' and the hollow pivot end 22' together. A pivot pin 40' fastens a wheel 6' between two lugs 21'.

The present invention is not limited to the above embodiments but various modification thereof may be made.

Furthermore, various changes in form and detail may be made without departing from the scope of the present invention.

I claim:

1. A wheel assembly comprises:

a main seat, a wheel holder seat disposed on a bottom of the main seat, a hollow pivot end formed on an end of the wheel holder seat, two lugs extending downward from the wheel holder seat, the main seat having a reinforced main body, a hollow pivot cover connected to the reinforced main body, a notch formed on a lower portion of the reinforced main body, two opposite inner flanges disposed on a bottom of the reinforced main body, an inner interior formed in the reinforced main body abutting the notch, and a post extending downward from an inner upper portion of the reinforced main body, the wheel holder seat having two opposite laterals engaging with the opposite inner flanges, a push rod having an upper recess hole, the push rod inserted in the inner interior, a coiled spring having a lower portion inserted in the upper recess hole and an upper portion enclosing the post, the hollow pivot end inserted in the hollow pivot cover, a pivot shaft fastening the hollow pivot cover and the hollow pivot end together, and a pivot pin fastening a wheel between two lugs.

2. A wheel assembly comprises:

a main seat, a bottom seat disposed on a bottom of the main seat, the bottom seat having two bottom flanges and an upper end connected to the main seat, a wheel holder seat disposed on the bottom seat, a hollow pivot end formed on an end of the wheel holder seat, two lugs extending downward from the wheel holder seat, the main seat having a reinforced main body, a bottom plate disposed on a bottom of the main seat, an inner interior formed in the reinforced main body, and a post extending downward from an inner upper portion of the reinforced main body, a push rod having an upper recess hole, the push rod inserted in the inner interior, a coiled spring having a lower portion inserted in the upper recess hole and an upper portion enclosing the post, a pivot shaft fastening an upper end of the bottom seat and the hollow pivot end together, and a pivot pin fastening a wheel between two lugs.

* * * * *